United States Patent
Spieker et al.

(10) Patent No.: US 10,513,248 B2
(45) Date of Patent: Dec. 24, 2019

(54) BRAKE FLUID PRESSURE FILTERING AND CONTROL SYSTEMS AND METHODS

(71) Applicant: Autoliv ASP, Inc., Ogden, UT (US)

(72) Inventors: Arnold H. Spieker, Commerce Township, MI (US); Juchirl Park, Southfield, MI (US)

(73) Assignee: VEONEER NISSIN BRAKE SYSTEMS JAPAN CO., LTD., Ueda-Shi, Nagano-Ken (JP)

( * ) Notice: Subject to any disclaimer, the term of this patent is extended or adjusted under 35 U.S.C. 154(b) by 183 days.

(21) Appl. No.: 15/639,598

(22) Filed: Jun. 30, 2017

(65) Prior Publication Data

US 2019/0001942 A1    Jan. 3, 2019

(51) Int. Cl.

| B60T 8/34 | (2006.01) |
| B60T 8/173 | (2006.01) |
| B60T 8/171 | (2006.01) |
| B60T 8/1755 | (2006.01) |
| B60T 8/40 | (2006.01) |

(52) U.S. Cl.
CPC .............. *B60T 8/173* (2013.01); *B60T 8/171* (2013.01); *B60T 8/1755* (2013.01); *B60T 8/34* (2013.01); *B60T 8/4081* (2013.01); *B60T 2220/04* (2013.01)

(58) Field of Classification Search
CPC ........ B60T 8/173; B60T 8/171; B60T 8/1755; B60T 8/34; B60T 8/4081; B60T 2220/04; B60T 1/10; B60T 7/042; B60T 8/3265; B60T 15/42; H01L 23/15
See application file for complete search history.

(56) References Cited

U.S. PATENT DOCUMENTS 3,968,482 A * 7/1976 Schuman ............... G08B 13/20
                                                340/544
5,316,379 A * 5/1994 Becker .................. B60T 8/1755
                                                180/408

(Continued)

FOREIGN PATENT DOCUMENTS

JP        2000-283193 A    10/2000

OTHER PUBLICATIONS

Murphy et al., Diagnostic End to End Monitoring & Fault Detection for Braking Systems, 2006, IEEE, p. 1-8 (Year: 2006).*

(Continued)

*Primary Examiner* — McDieunel Marc
(74) *Attorney, Agent, or Firm* — Stephen T. Olson; Harness, Dickey & Pierce, P.L.C.

(57) ABSTRACT

A braking control system of a vehicle includes a pressure control device that regulates brake fluid flow to a brake caliper of a wheel from a brake fluid cylinder. A pressure sensor measures a pressure of the brake fluid applied to the brake caliper. A filter module filters the measured pressure based on a rotational frequency of the wheel. The filtering produces a filtered pressure of the brake fluid applied to the brake caliper. A target pressure module sets a target pressure for the brake fluid for application to the brake caliper. A difference module determines a pressure difference between the filtered pressure and the target pressure. A pressure control module actuates the pressure control device based on the pressure difference.

20 Claims, 8 Drawing Sheets

(56) References Cited

U.S. PATENT DOCUMENTS

| | | | | |
|---|---|---|---|---|
| 5,645,326 | A * | 7/1997 | Sano | B60T 8/1755 |
| | | | | 303/146 |
| 5,695,258 | A * | 12/1997 | Reid | B60T 15/42 |
| | | | | 303/28 |
| 5,722,743 | A * | 3/1998 | Sano | B60T 8/246 |
| | | | | 303/146 |
| 6,577,941 | B2 | 6/2003 | Kawasaki et al. | |
| 7,516,007 | B2 * | 4/2009 | Tamai | B60T 7/122 |
| | | | | 701/70 |
| 8,219,283 | B2 | 7/2012 | Recker et al. | |
| 8,265,846 | B2 | 9/2012 | Kinser et al. | |
| 8,738,260 | B2 * | 5/2014 | Miyazaki | B60T 1/10 |
| | | | | 180/65.265 |
| 8,985,283 | B2 | 3/2015 | Oshio et al. | |
| 9,260,096 | B2 * | 2/2016 | Miyata | B60T 7/042 |
| 2006/0278022 | A1 | 12/2006 | Ono | |
| 2010/0253137 | A1 * | 10/2010 | Matsuzaki | B60T 8/3265 |
| | | | | 303/155 |
| 2014/0008967 | A1 | 1/2014 | Takeuchi et al. | |
| 2014/0070935 | A1 * | 3/2014 | Wang | B60W 40/06 |
| | | | | 340/443 |
| 2014/0183936 | A1 | 7/2014 | Kinoshita et al. | |
| 2014/0305751 | A1 | 10/2014 | Yamamoto | |
| 2014/0379234 | A1 | 12/2014 | Kato et al. | |
| 2015/0081186 | A1 | 3/2015 | Yasui et al. | |
| 2015/0151727 | A1 | 6/2015 | Yasui et al. | |
| 2016/0123419 | A1 | 5/2016 | Masuda | |
| 2016/0245351 | A1 | 8/2016 | Johnson et al. | |
| 2017/0186710 | A1 * | 6/2017 | Yoon | H01L 23/15 |
| 2017/0225666 | A1 * | 8/2017 | Kasten | B60T 8/173 |

OTHER PUBLICATIONS

Kumar et al., Hybrid braking: Future vehicle technology, 2014, IEEE, p. 1-6 (Year: 2014).*

Martinez et al., Modelling and estimation of friction brake torque for a brake by wire system, 2014, IEEE, p. 1-7 (Year: 2014).*

Jearsiripongkul et al., Stability analysis of a new model for floating caliper disk brake, 2002, IEEE, p. 535-539 (Year: 2002).*

International Search Report and Writtion Opinion for PCT/US2018/039286 dated Aug. 27, 2018.

Smith, Jullius.O. "Constant Peak-Gain Resonator; Introduction to Digital Filters with Audio Applications", http://ccrma.stanford.edu/~jos/filters/, online book, 2007 edition. Center for Computer Research in Music and Acoustics (CCRMA), Stanford University. Mar. 2, 2017.

* cited by examiner

BRAKE FLUID PRESSURE FILTERING AND CONTROL SYSTEMS AND METHODS

FIELD

The present disclosure relates to brake systems for motor vehicles and more particularly to systems and methods for filtering brake fluid pressure measured using a brake fluid pressure sensor to minimize rotor based oscillation in the measured brake fluid pressure.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes a brake system that can be used to help slow a vehicle. For example, the brake system may slow the vehicle when a driver actuates a brake pedal within a passenger cabin of the vehicle. Different types of brake systems include disc brake systems, drum brake systems, brake systems including a combination of disc brakes and drum brakes, and other types of brake systems.

In a disc brake system, a caliper, a set of two or more brake pads, and a brake rotor are provided with a wheel of the vehicle. The brake rotor rotates with the wheel. The caliper actuates and squeezes the brake pads against the brake rotor to slow the rotational speed of the wheel. The caliper actuates and squeezes the brake pads against the brake rotor, for example, when the driver actuates/depresses a brake pedal. A brake rotor, a brake caliper, and a set of brake pads may be provided for each wheel in some vehicles.

SUMMARY

In a feature, a braking control system of a vehicle is described. A pressure control device regulates brake fluid flow to a brake caliper of a wheel from a brake fluid cylinder. A pressure sensor measures a pressure of the brake fluid applied to the brake caliper. A filter module filters the measured pressure based on a rotational frequency of the wheel. The filtering produces a filtered pressure of the brake fluid applied to the brake caliper. A target pressure module sets a target pressure for the brake fluid for application to the brake caliper. A difference module determines a pressure difference between the filtered pressure and the target pressure. A pressure control module actuates the pressure control device based on the pressure difference.

In further features, based on a plurality of values of the measured pressure from a predetermined period, determines whether to filter the measured pressure based on one of: (a) only the rotational frequency of the wheel; (b) only twice the rotational frequency of the wheel; and (c) both the rotational frequency of the wheel and twice the rotational frequency of the wheel.

In further features, the filter module filters the measured pressure based on at least one of (i) the rotational frequency of the wheel, (ii) twice the rotational frequency of the wheel, and (iii) both of (a) the rotational frequency of the wheel and (b) twice the rotational frequency of the wheel.

In further features: a wheel speed sensor measures a rotational speed of the wheel; and a rotational frequency module determines the rotational frequency of the wheel based on the rotational speed of the wheel.

In further features, the rotational frequency module determines the rotational frequency of the wheel based on an average rotational speed of all wheels of the vehicle.

In further features, a brake pedal position sensor measures a position of a brake pedal, and the target pressure module determines the target pressure for the brake fluid output to the brake caliper based on the position of the brake pedal.

In further features, the pressure control module (i) actuates the pressure control device, thereby decreasing the measured pressure, when the difference is such that the filtered pressure is greater than the target pressure and (ii) actuates the pressure control device, thereby increasing the measured pressure, when the difference is such that the filtered pressure is less than the target pressure.

In further features, the filter module filters the measured pressure using a two-pole resonator.

In further features, the filter module sets the filtered pressure based on subtracting an output of the two-pole resonator from the measured pressure.

In further features, the filter module applies at least one of a notch filter and a stopband filter to the measured pressure at the rotational frequency of the wheel.

In a feature, a braking control method of a vehicle includes: by a pressure control device, regulating brake fluid flow to a brake caliper of a wheel from a brake fluid cylinder; using a pressure sensor, measuring a pressure of the brake fluid output to the brake caliper; filtering the measured pressure based on a rotational frequency of the wheel, the filtering producing a filtered pressure of the brake fluid output to the brake caliper; setting a target pressure for the brake fluid output to the brake caliper; determining a pressure difference between the filtered pressure and the target pressure; and actuating the pressure control device based on the pressure difference.

In further features, the braking control method further includes, based on a plurality of values of the measured pressure from a predetermined period, determining whether to filter the measured pressure based on one of: (a) only the rotational frequency of the wheel; (b) only twice the rotational frequency of the wheel; and (c) both the rotational frequency of the wheel and twice the rotational frequency of the wheel.

In further features, filtering the measured pressure includes filtering the measured pressure based on at least one of (i) the rotational frequency of the wheel, (ii) twice the rotational frequency of the wheel, and (iii) both of (a) the rotational frequency of the wheel and (b) twice the rotational frequency of the wheel.

In further features, the braking control method further includes: measuring, using a wheel speed sensor, a rotational speed of the wheel; and determining the rotational frequency of the wheel based on the rotational speed of the wheel.

In further features, determining the rotational frequency of the wheel includes determining the rotational frequency of the wheel based on an average rotational speed of all wheels of the vehicle.

In further features, the braking control method further includes measuring, using a brake pedal position sensor, a position of a brake pedal, and determining the target pressure includes determining the target pressure for the brake fluid output to the brake caliper based on the position of the brake pedal.

In further features, actuating the pressure control device includes: (i) actuating the pressure control device, thereby decreasing the measured pressure, when the difference is such that the filtered pressure is greater than the target pressure; and (ii) actuating the pressure control device, thereby increasing the measured pressure, when the difference is such that the filtered pressure is less than the target pressure.

In further features, filtering the measured pressure includes filtering the measured pressure using a two-pole resonator.

In further features, filtering the measured pressure includes setting the filtered pressure based on subtracting an output of the two-pole resonator from the measured pressure.

In further features, filtering the measured pressure includes applying at least one of a notch filter and a stopband filter to the measured pressure at the rotational frequency of the wheel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A brake rotor may vary in thickness around the brake rotor in areas where the brake pads contact the brake rotor. This thickness variation around a rotor may occur, for example, due to (unintentional) contact between one or more brake pads and the brake rotor at times when the brake pads are not intended to be used for braking. For example, one or more brake pads may contact a brake rotor at times when the brake pads are not intended to be used for braking due to a non-parallel alignment of the brake rotor and a brake caliper.

In such circumstances, the brake pad(s) contact the brake rotor at the same one or two locations around the brake rotor per wheel/brake rotor revolution when the brakes are not intended to be used for braking. This contact wears the brake rotor at the one or two locations to a greater extent than other locations around the brake rotor where this contact does not occur. The thickness of the brake rotor at these one or two locations may therefore be or become less than the thickness of the brake rotor at other locations.

The brake caliper squeezes the brake pads against the brake rotor to perform braking. At the one or two locations where the brake rotor is thinner due to the contact described above, the brake caliper may actuate further due to brake fluid pressure urging the brake caliper to extend to squeeze the brake pads against the brake rotor during braking. The brake fluid pressure may therefore vary as the brake rotor rotates. More specifically, the brake fluid pressure decreases when the brake pads reach these one or two locations around the brake rotor where the brake rotor is thinner and increases when the brake pads are at places where the brake rotor is thicker.

A closed loop controller controls brake fluid flow to the calipers to adjust the brake fluid pressure toward a target brake fluid pressure. Control of the brake fluid flow may become unstable, however, based on the variation in thickness of the brake rotor discussed above. For example, in an effort to achieve the target brake fluid pressure, the closed loop controller may increase brake fluid flow to the calipers in response to a decrease in the brake fluid pressure attributable to brake pads being at a place where the brake rotor is thinner. The closed loop controller may also decrease brake fluid flow to the calipers in response to an increase in the brake fluid pressure attributable to brake pads being at a place where the brake rotor is thicker. The response of the closed loop controller may increase in magnitude per loop in an attempt to remedy the deviation from the target brake fluid pressure and, thus, cause control to become unstable.

According to the present application, such the brake fluid pressure is filtered to attenuate changes in the brake fluid pressure attributable to the brake pads reaching the one or two locations where the brake rotor is thinner due to the contact described above. The filtering increases the accuracy of control based on a target pressure at the location of the brake fluid pressure.

Figure 1A:
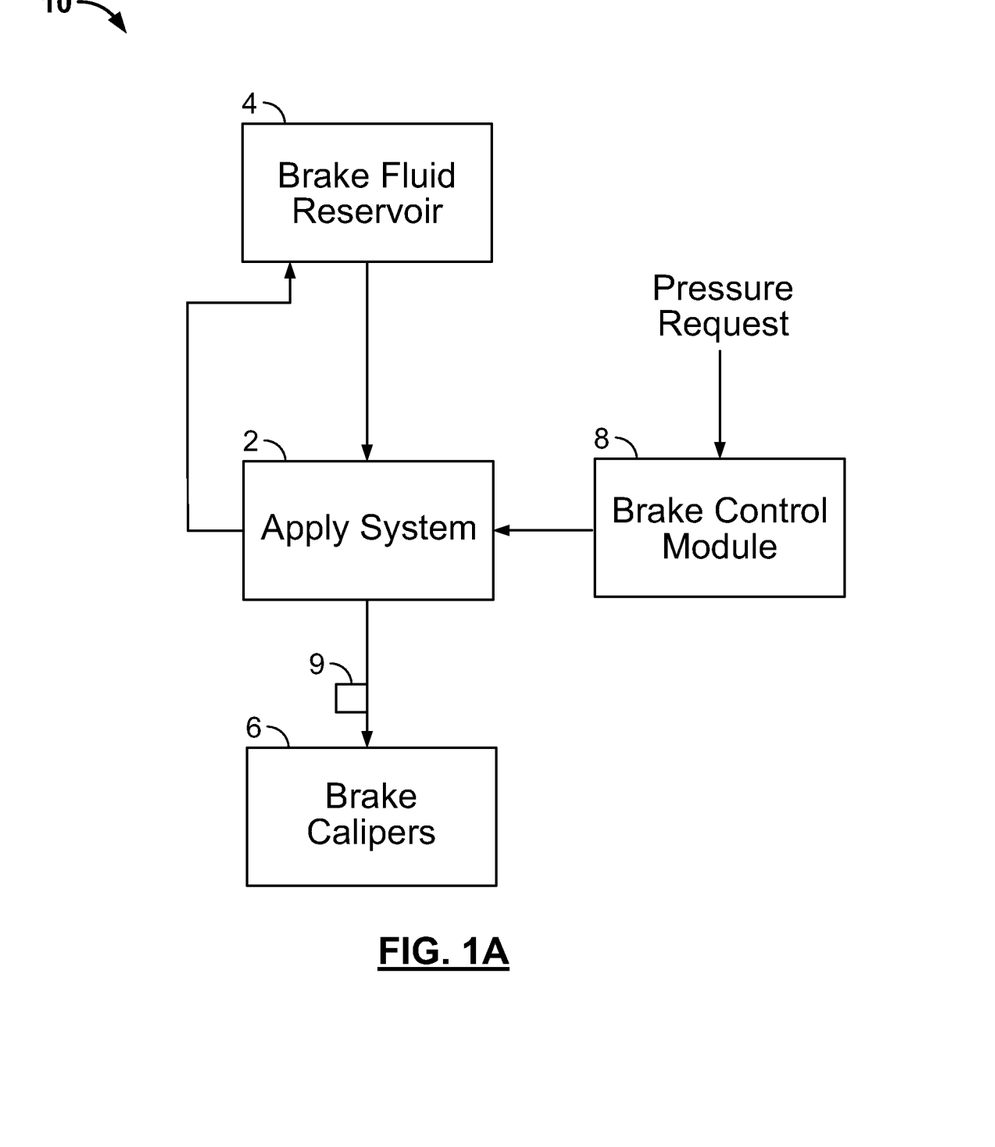
FIGS. 1A-1B are example schematic illustrations of a portion of a brake system.

Referring to FIG. 1A, an example schematic of a brake system 10 of a vehicle is presented. Generally speaking, the brake system 10 includes an apply system 2 that regulates brake fluid flow from a brake fluid reservoir 4 to brake calipers 6 based on signals from a brake control module 8. The apply system 2 also regulates brake fluid flow back to the brake fluid reservoir 4 based on signals from the brake control module 8.

The apply system 2 may include, for example, one or more pressure control devices, such as one or more electric motors, one or more valves, and/or other types of pressure control devices, that actuate and adjust brake fluid flow to and from the brake calipers 6 based on the signals from the brake control module 8.

A pressure sensor 9 measures a pressure of brake fluid applied to the brake calipers 6. The brake control module 8 filters the pressure of the brake fluid measured by the pressure sensor 9 to remove, minimize, or cancel oscillations attributable to thinning of the brake rotors at one or more locations. The brake control module 8 controls the apply system 2 in closed loop based on the filtered pressure and a target pressure of the brake fluid applied to the mechanical brakes. More specifically, the brake control module 8 controls the apply system 2 to increase brake fluid flow to the brake calipers (and increase the pressure of brake fluid applied to the brake calipers 6) when the filtered pressure is less than the target pressure. The brake control module 8 controls the apply system 2 to release brake fluid from the brake calipers 6 to the reservoir 4 (and decrease the pressure of brake fluid applied to the brake calipers 6) when the filtered pressure is greater than the target pressure.

The brake control module 8 may determine or set the target pressure based on, for example, actuation of a brake pedal of the vehicle and/or a pressure request. The pressure request may be determined by the brake control module 8 or provided by another control module of the vehicle. For example, the pressure request may be generated by an autonomous or semi-autonomous vehicle control module based on based on preventing the vehicle from contacting an object, maintaining at least a predetermined following distance between vehicles, stability, steering, etc.

Figure 1B:
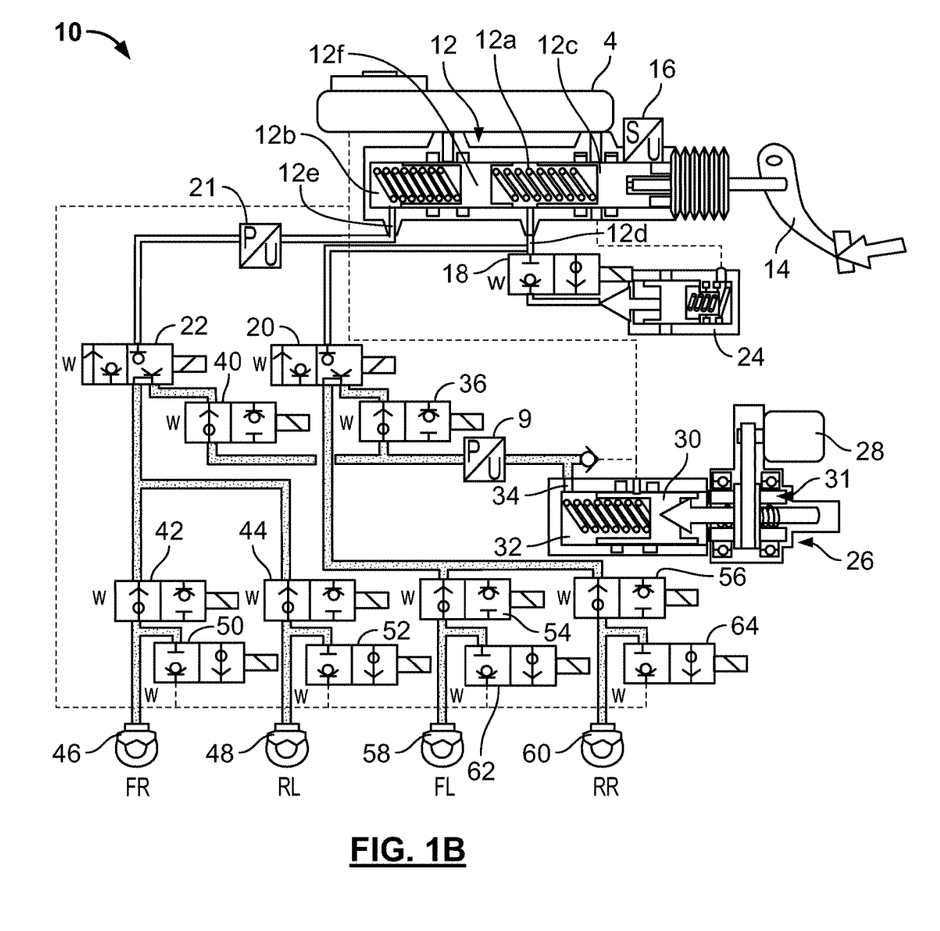

Referring to FIG. 1B, a schematic of an example implementation of the brake system 10 is presented. The brake system 10 includes a master cylinder 12 that receives a mechanical input from an input device, for example, a brake pedal 14. A stroke sensor 16 measures a stroke (i.e., position) of the brake pedal 14, of a stroke of an input rod, or a stroke of a piston of the master cylinder 12. While these examples are provided, the stroke sensor 16 may measure other suitable parameters indicative of a position or displacement of the brake pedal 14, for example, relative to a resting position of the brake pedal 14. The stroke sensor 16 may also be referred to as a brake pedal position sensor.

The master cylinder 12 includes a primary circuit portion 12a having a primary piston 12c. The master cylinder 12 also includes a secondary circuit portion 12b having a secondary piston 12f. The primary piston 12c is connected to the brake pedal 14 by a push rod. The brake pedal 14 moves the primary piston 12c via the push rod. The secondary piston 12f moves based on movement of the primary piston 12c.

The primary circuit portion 12a includes a first output port 12d in fluid communication with both a pedal feel simulator valve (PFSV) 18 and a primary circuit master cut valve (MCV) 20. The secondary circuit portion 12b is in communication with a secondary circuit MCV 22 via a second output port 12e. Based on the position of the primary piston 12c, brake fluid flows from the brake fluid reservoir 4, through the master cylinder 12, and to the PFSV 18 and the primary circuit MCV 20 via the first output port 12d. Based on the position of the secondary piston 12f, brake fluid flows from the brake fluid reservoir 4, through the master cylinder 12, and to the secondary circuit MCV 22 via the second output port 12e.

A pressure sensor 21 may measure a pressure of brake fluid output by the master cylinder 12 to the secondary circuit MCV 22. In various implementations, the pressure sensor 21 may measure a pressure of brake fluid output by the master cylinder 12 via the first output port 12d or multiple pressure sensors may be provided to measure brake fluid pressure output from both of the first and second output ports 12d and 12e. The PFSV 18 is in communication with a pedal feel simulator (PFS) device 24 which is in communication with the primary circuit portion 12a of the master cylinder 12. The PFS device 24 may selectively adjust the PFSV 18, for example, to adjust a feeling of the brake pedal 14 to the driver. In various implementations, a difference between the pressure measured by the pressure sensor 9 and the pressure measured by the pressure sensor 21 may reflect a pressure of brake fluid applied to the calipers 46, 48, 58, and 60.

The brake system 10 also includes a slave cylinder 26. The slave cylinder 26 controls pressure of brake fluid applied to brake calipers. An electric motor 28 of the slave cylinder 26 controls linear movement of a piston 30 via a ball screw assembly 31. The position of the piston 30 regulates brake fluid flow from a fluid chamber 32, through an output port 34, to an input port of a primary circuit apply valve 36 (APV). The primary circuit APV 36 is also in fluid communication with an input port of the primary circuit MCV 20. The position of the piston 30 also regulates brake fluid flow from the fluid chamber 32 through the output port 34 to a port of a secondary circuit APV 40.

The primary circuit MCV 20 and the primary circuit APV 36 form a first valve subsystem within the primary circuit portion 12a. The secondary circuit MCV 22 and the secondary circuit APV 40 form a second valve subsystem with the secondary circuit portion 12b. The pressure sensor 9 may measure a pressure of brake fluid output by the slave cylinder 26 to the primary and secondary circuit MCVs 20 and 22. While the example location of the pressure sensor 9 is shown, the pressure sensor 9 may be implemented at another location.

An output port of the secondary circuit MCV 22 is in fluid communication with secondary circuit control valves 42 and 44. The secondary circuit control valves 42 and 44 control pressure of brake fluid applied to a front/right (FR) brake caliper 46 and a rear/left (RL) brake caliper 48, respectively. The secondary circuit control valves 42 and 44 may also be in fluid communication with secondary circuit electronic stability control valves 50 and 52 (ESC valves), respectively. The second circuit ESC valves 50 and 52 may also be controlled to control the pressure of brake fluid applied to the FR and RL brake calipers 46 and 48.

The primary circuit MCV 20 is in fluid communication with primary circuit control valves 54 and 56. Primary circuit control valves 54 and 56 control pressure of brake fluid applied to a front/left (FL) brake caliper 58 and a rear/right (RR) brake caliper 60, respectively. The primary circuit control valves 54 and 56 are also in fluid communication with primary circuit ESC valves 62 and 64, respectively. The primary circuit ESC valves 62 and 64 may also be controlled to control the pressure of brake fluid applied to the FL and RR brake calipers 58 and 60. The brake calipers 48, 48, 58, and 60 actuate (e.g., extend) and squeeze respective brake pads against respective brake rotors to slow the respective wheels. The brake calipers 48, 48, 58, and 60 also actuate (e.g., retract) to release the respective brake pads from contacting the respective brake rotors.

The primary circuit portion 12a of the master cylinder 12, the primary circuit MCV 20, the primary circuit APV 36, the slave cylinder 26, primary circuit control valves 54 and 56, primary circuit ESC valves 62 and 64, and brake calipers 58 and 60 are included within the primary circuit of the brake system 10. The secondary circuit portion 12b of the master cylinder 12, the secondary circuit MCV 22, the secondary circuit APV 40, the secondary circuit control valves 42 and 44, the secondary ESC valves 50 and 52, and the FR and RL brake calipers 46 and 48, are included within the secondary circuit.

A portion of the brake system 10 forms a "direct apply" subsystem, and a portion forms an "isolated apply" subsystem." More specifically, the isolated apply subsystem includes the slave cylinder 26, the electric motor 28, and the ball screw assembly 31. The direct apply subsystem may include the master cylinder 12, which is mechanically coupled to and actuated by the brake pedal 14, and builds fluid pressure in at least one of the PFSV 18, the primary circuit portion 12a, and the secondary circuit portion 12b in direct relation to the position of the brake pedal 14. In contrast with the direct apply subsystem, the isolated apply subsystem is mechanically isolated from brake pedal actuation. The isolated apply subsystem is instead controlled to control pressure of brake fluid applied to the calipers 46, 48, 58, and 60 based on the measured position of the brake pedal 14. While the example of the electric motor 28, the piston 30, and the ball screw assembly 31 is provided, an electric pump and an accumulator or another suitable type of electrically controlled brake fluid pressure control device may be used.

The brake control module 8 controls the flow of brake fluid to the calipers 46, 48, 58, and 60 and the flow of brake fluid back to the brake fluid reservoir 4. For example, the brake control module 8 may control the flow of brake fluid to and from the calipers 46, 48, 58, and 60, for example, by controlling the electric motor 28, and the valves 20, 22, 36, 40, 42, 44 50, 52, 54, 56, 62 and 64.

The brake control module 8 may control the flow of brake fluid, for example, based on signals from the pressure sensor 21, the pressure sensor 9, and the stroke sensor 16. For example, the brake control module 8 may increase the pressure of brake fluid applied to the calipers 46, 48, 58, and 60 when braking of the vehicle is requested and decrease the pressure of brake fluid applied to the calipers 46, 48, 58, and 60 when braking of the vehicle is not being requested. Braking can be requested, for example, via driver actuation of the brake pedal 14 and/or by another control module of the vehicle.

Figure 2A:
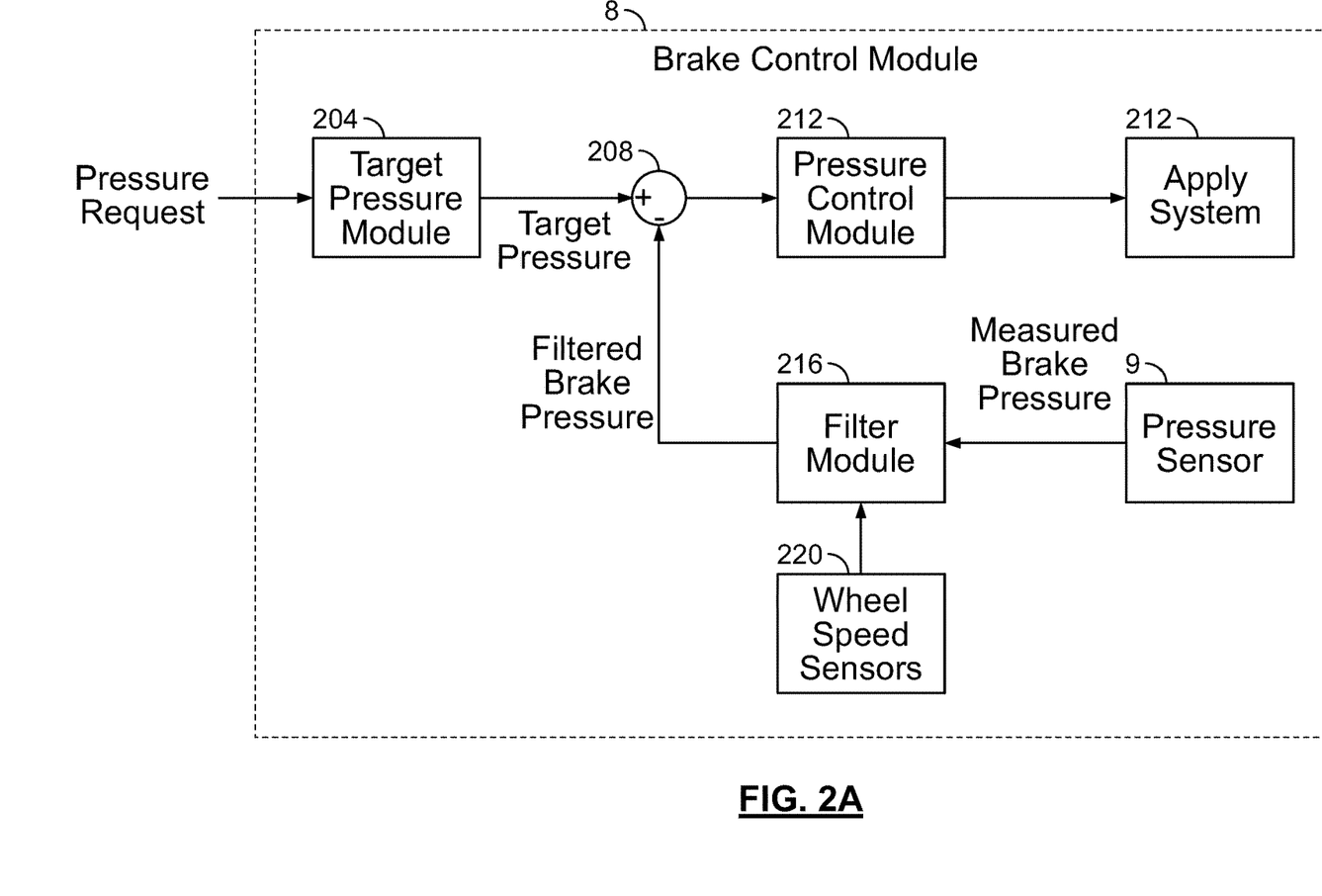
FIGS. 2A-2B are functional block diagrams of example brake control systems.
Figure 2B:
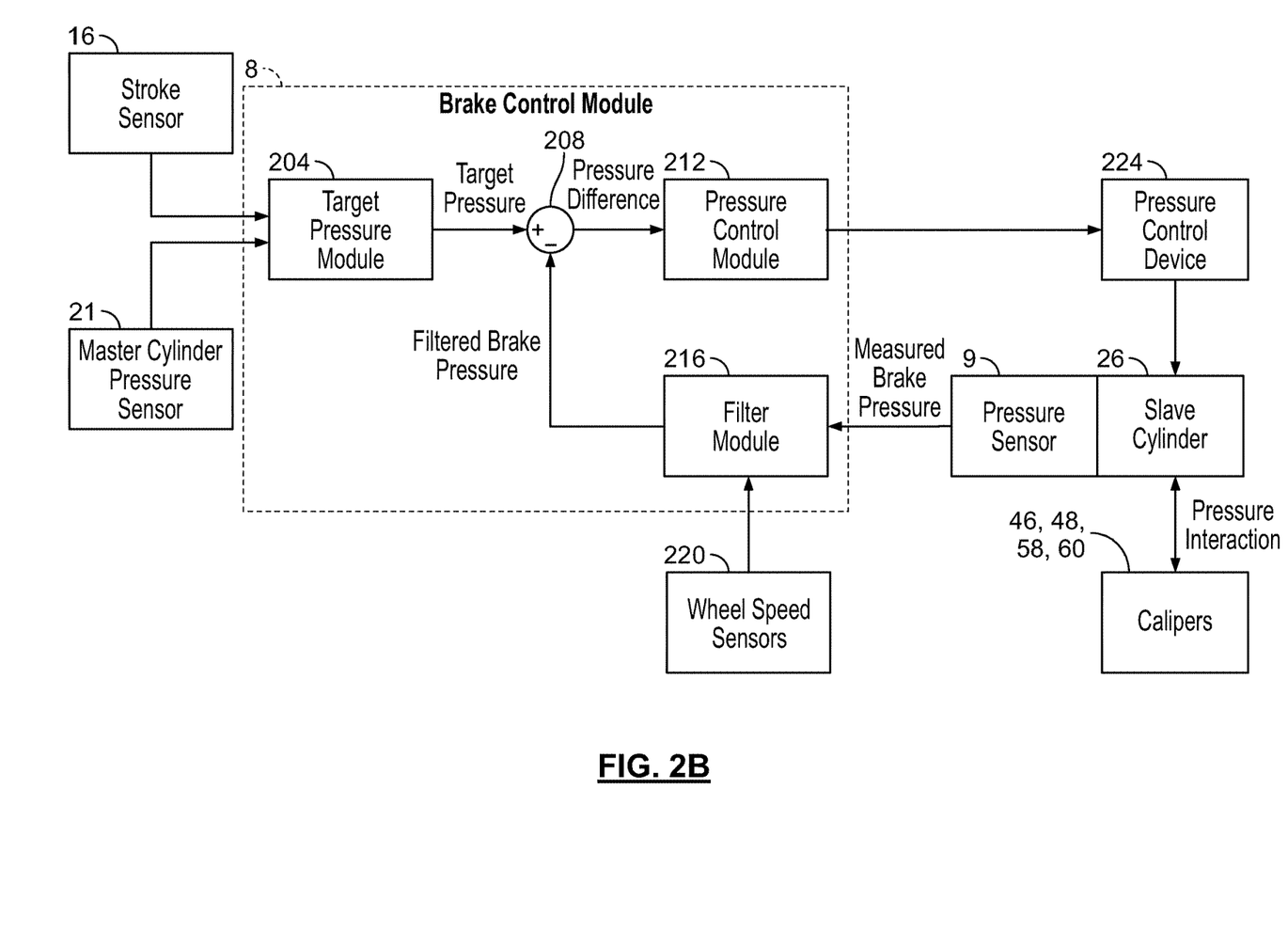

Referring to FIG. 2A, a functional block diagram of an example braking control system is presented. FIG. 2B also includes a functional block diagram of an example braking control system. The brake control module 8 includes a target pressure module 204, a difference module 208, a pressure control module 212, and a filter module 216.

The target pressure module 204 determines a target (brake fluid) pressure to apply to the calipers. The target pressure module 204 may set the target pressure, for example, based on or equal to a pressure request received from another module of the vehicle and/or based on a brake pedal position measured using the stroke sensor 16. As an example, the target pressure module 204 may increase the target pressure as the pressure request increases and/or as the brake pedal position increases. The target pressure module 204 may decrease the target pressure as the pressure request decreases and/or as the brake pedal position decreases.

As shown in FIG. 2B, in an example, the target pressure module 204 may determine a target brake fluid pressure output from the slave cylinder 26. The target pressure module 204 may determine the target pressure, for example, based on the brake pedal position measured using the stroke sensor 16 and a master cylinder output pressure. The master cylinder output pressure may be measured using the pressure sensor 21. The target pressure module 204 may determine the target pressure using one or more equations or lookup tables that relate master cylinder output pressures and brake pedal positions to target pressures output from the slave cylinder 26. For values between entries of a table, interpolation (e.g., linear interpolation) may be used. As an example only, the target pressure module 204 may increase the target pressure as the brake pedal position increases (indicating greater displacement of the brake pedal 14 to decelerate more rapidly) and/or the master cylinder output pressure increases, and vice versa.

Referring to FIGS. 2A and 2B, the difference module 208 determines a (brake fluid) pressure difference based on a filtered brake (fluid) pressure and the target pressure. For example, the difference module 208 may set the pressure difference based on or equal to the target pressure minus the filtered brake fluid pressure. The filter module 216 filters a measured brake (fluid) pressure to produce the filtered brake fluid pressure. The measured brake fluid pressure is measured using the pressure sensor 9. The filtering is discussed further below.

Based on the pressure difference, the pressure control module 212 controls one or more pressure control devices of the apply system 2 based on the pressure of brake fluid applied to the calipers. In the example of FIG. 2B, the pressure control module 212 controls the pressure of brake fluid output by the slave cylinder 26 based on the pressure difference. More specifically, the pressure control module 212 controls operation of one or more pressure control devices, such as pressure control device 224, based on the pressure difference. An example of the pressure control device 224 includes the electric motor 28, the piston 30, and the ball screw assembly 31, although other types of electrically controlled pressure control devices can be used.

The pressure control module 212 may control the pressure control device 224, for example, using closed-loop control to adjust the pressure difference toward zero. Examples of closed-loop control include, for example, proportional (P), proportional-integral (PI), integral (I), and proportional-integral-derivative (PID) control, although another suitable type of closed-loop control may be used. For example, the pressure control module 212 may apply electrical power to the one or more pressure control devices using closed-loop control to adjust the pressure difference toward zero.

In the example of the electric motor 28, the piston 30, and the ball screw assembly 31, the pressure control module 212 may determine a target torque for the electric motor 28 based on the pressure difference. The pressure control module 212 may determine the target torque, for example, using one or more equations or lookup tables that relate pressure differences to target torques. The pressure control module 212 may apply electrical power to the electric motor 28 based on the target torque. The pressure control module 212 may determine characteristics of power to apply to the electric motor, for example, using one or more equations or lookup tables that relate target torques to electrical power characteristics. The electrical power characteristics may include, for example, voltage, current, signal pulse width to apply to a power conversion device (e.g., an inverter), etc. The electrical power may be provided by a battery or another suitable energy storage device.

Over time, the brake rotors may have thickness variation due to alignment of the brake rotor with respect to the calipers 46, 48, 58, and 60. For example, even when braking is not intended by the driver or the brake control module 8, the brake pads of a wheel may momentarily contact that wheel's brake rotor once or twice in the same one or two locations during each revolution of the wheel and brake rotor. This (unintentional) contact may only occur at the same one or two locations during each revolution of the wheel and brake rotor and wears the brake rotor at only those one or two locations. Thickness of the brake rotor at those one or two locations may therefore be less than thickness of other locations around the brake rotor. By way of contrast, the brake pads maintain contact around the entirety of the brake rotor, thereby providing more even wear around the brake rotor, during intended braking of the vehicle such as when the driver actuates the brake pedal 14.

In the example of two locations, the two locations may be on opposite ends of one side/face of the brake rotor, such as 180 degrees rotationally from one another around the brake rotor. The two locations may both be on an inner or an outer surface of the rotor, or one of the locations may be on the inner surface of the brake rotor and the other one of the locations may be on the outer surface of the brake rotor.

The thickness variations around a brake rotor cause oscillations in the brake fluid pressure measured using the pressure sensor 9 during braking. More specifically, during braking, the caliper may actuate (e.g., extend) at the one or more locations relative to other locations around the brake rotor. The actuation (e.g., extension) of the caliper causes a change (e.g., decrease) in the brake fluid pressure measured using the pressure sensor 9. Thus, the brake fluid pressure measured using the pressure sensor 9 may oscillate due to the thickness variations of the brake rotor at the one or more locations. Oscillation due to the thickness variations of the brake rotor may cause instability of the pressure control module 212 and/or inaccuracy in the pressure control module 212's control of brake fluid flow to and from the calipers.

Figure 4:
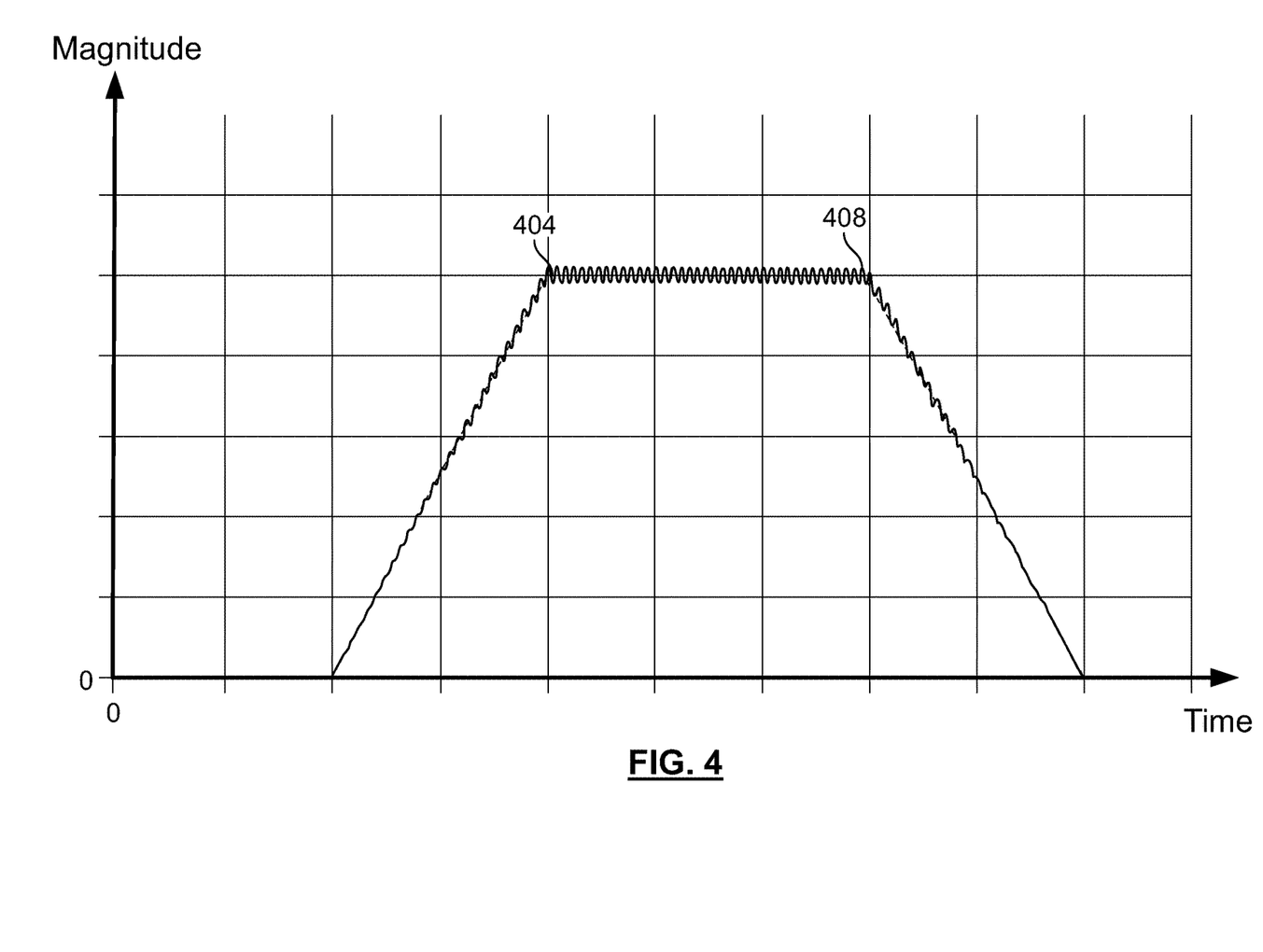
FIG. 4 is a graph showing a measured brake fluid pressure for brake rotors with and without thickness variation.

FIG. 4 includes an example graph illustrating brake (fluid) pressure measured by the pressure sensor 9 versus time. Trace 404 illustrates the brake fluid pressure measured using the pressure sensor 9 based on a brake rotor that does not include thickness variation, such as a brand new brake rotor. Trace 408 illustrates a brake fluid pressure measured using the pressure sensor 9 based on a brake rotor that includes a thickness variation from the brake pads unintentionally contacting the brake rotor at the same one or more locations. As illustrated by trace 408, the measured brake fluid pressure includes oscillations attributable to the thickness variations caused by such unintentional contact.

To minimize the effect of the oscillations on the pressure difference, the filter module 216 filters the measured brake fluid pressure based on wheel rotational frequency to produce the filtered brake fluid pressure. The filter module 216 (or a rotational frequency module) may determine the wheel rotational frequency based on a rotational speed of one or more wheels. The wheel rotational frequency may be determined using one or more equations or lookup tables that relate rotational wheel speed to wheel rotational frequency. Wheel speed sensors 220 may measure and provide the rotational speeds of the wheels, respectively. As an example only, an average of all of the wheel speeds of the vehicle may be used to determine the wheel rotational frequency. In various implementations, wheel position sensors (e.g., variable reluctance sensors) may measure positions of the wheels and wheel speeds may be determined based on changes in the wheel positions, respectively, over time.

Figure 3:
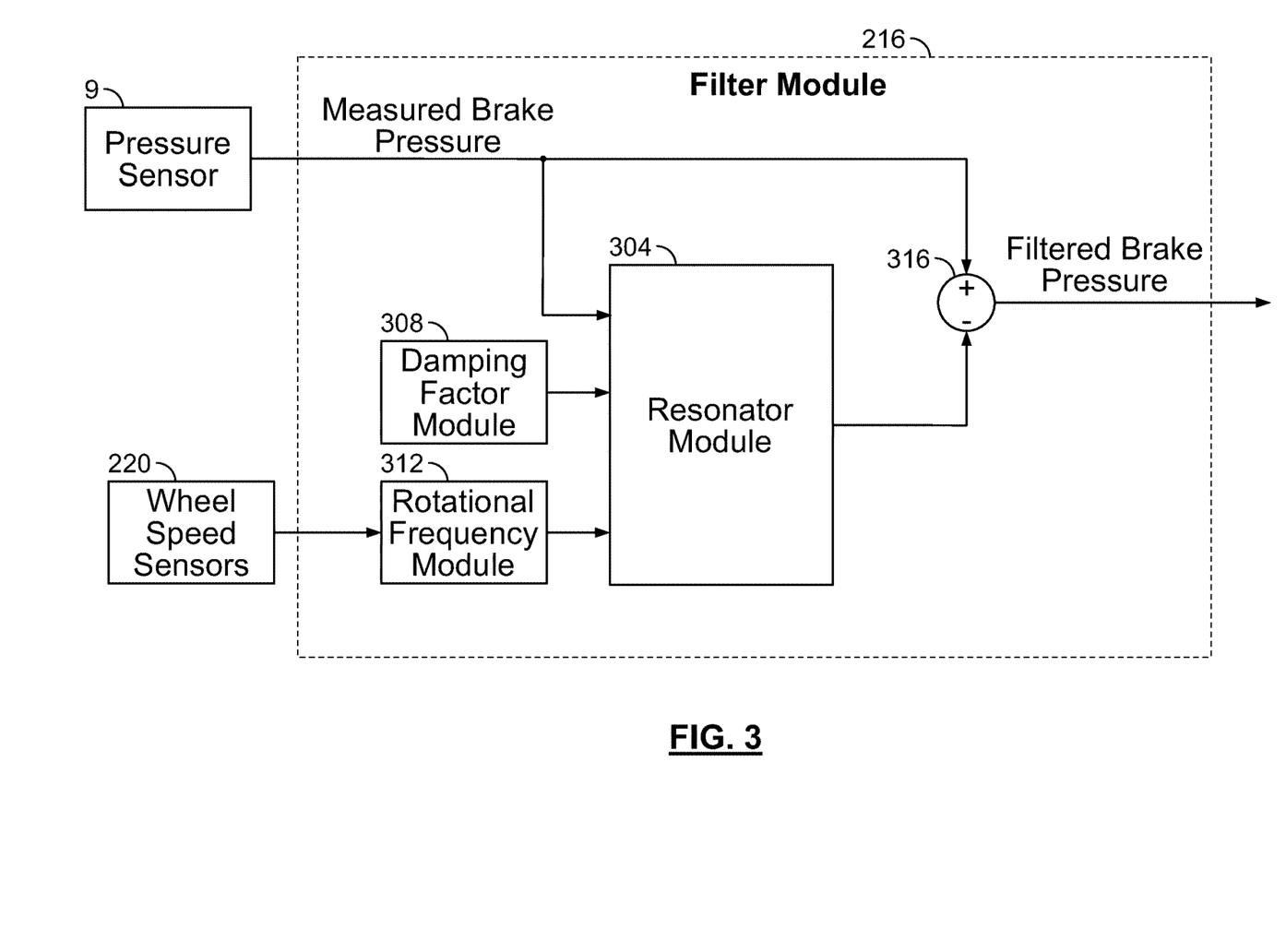
FIG. 3 is a functional block diagram of an example filter module.

Referring to FIG. 3, a functional block diagram of an example implementation of the filter module 216 is presented. Generally speaking, the filter module 216 may apply one or more filters, such as one or more band-stop filters and/or one or more notch filters, to the measured brake fluid pressure to produce the filtered brake fluid pressure. The application of the one or more filters compensates for or cancels changes in the measured brake fluid pressure attributable to the variation in brake rotor thickness.

One example type of notch filter includes a unity gain resonator, such as a two-pole unity gain resonator. While the example of a two-pole unity gain resonator will be described below, other types of band-stop and notch filters may be used.

In the example of thickness variation at one location, a stopband filter (or a notch filter) may be applied to the measured brake fluid pressure to remove oscillation at the wheel rotational frequency. In the example of two thickness variation at two locations spaced approximately 180 degrees apart from each other around the brake rotor, a stopband filter (or a notch filter) may be applied to the measured brake fluid pressure to remove oscillation at the wheel rotational frequency and two times the wheel rotational frequency. Applying a stopband or notch filter at a frequency (e.g., the wheel rotational frequency or 2× the wheel rotational frequency) may include filtering at that frequency and a predetermined frequency band around (e.g., centered at) that frequency. Oscillations in the measured brake fluid pressure attributable to the thickness variations of the brake rotor may therefore be minimized in the filtered brake fluid pressure.

A rotational frequency module 312 may determine the wheel rotational frequency. The rotational frequency module 312 may determine the wheel rotational frequency (e.g., wheel revolutions per period) based on one or more measured wheel speeds of the vehicle, such as based on an average of the measured wheel speeds of the vehicle. The wheel speed sensors 220 may measure the wheel speeds, respectively, of the vehicle. The rotational frequency module 312 may determine the wheel rotational frequency using one or more equations or lookup tables that relates wheel speed to wheel rotational frequency. The rotational frequency module 312 may use interpolation, such as linear interpolation, for values between entries of such a lookup table.

In one example, the filter module 216 includes a resonator module 304. The resonator module 304 may include a unity gain resonator or another suitable type of module that generates cancellation values to remove oscillations from the measured brake fluid pressure at around one and two times the wheel rotational frequency. The unity gain resonator may be, for example, a two-pole unity gain resonator. The filter module 216 may sample and digitize or receive digital samples from the pressure sensor 9 at a predetermined rate. The resonator module 304 may determine cancellation values at the predetermined rate.

As an example, the resonator module 304 (e.g., a two-pole unity gain resonator) may be represented by the following transfer function $$H(z) = \frac{B(z)}{A(z)} = \frac{1-z^2}{1-2R\cos(\theta_C)z^{-1}+R^2z^{-2}},$$

where $\theta_c$ is an angular wheel position, H(z) corresponds to a cancellation value output by the resonator module 304, and R is a predetermined damping factor value. The resonator module 304 may determine the angular wheel position, for example, by (mathematically) integrating a wheel speed (e.g., the average of the measured wheel speeds). As described above, the angular wheel position may be measured using a sensor or determined for example by integrating wheel speed.

A damping factor module 308 provides the predetermined damping factor value (R). The predetermined damping factor value may be a fixed value and may be calibrated to minimize oscillation. For example only, the predetermined damping factor value may be approximately 0.99 or another suitable value between 0.0 and 1.0. In the above example, the predetermined damping factor value dictates a width of the filter applied by the notch filter or stopband filter. The width (the frequency band encompassed) decreases as the predetermined damping factor value increases and vice versa.

A subtraction module 316 subtracts the cancellation value output at a given time from the measured brake fluid pressure at that time to produce the filtered brake fluid pressure. While the example of the resonator module 304 and the subtraction module 316 are provided, another suitable type of notch or bandstop filter may be used to filter the measured brake fluid pressure to remove or compensate for oscillation occurring at one and/or two times the wheel rotational frequency. While the example of use of cancellation values is provided, compensation (e.g., including determining compensation values and summing the compensation values with the measured brake fluid pressure) may be used.

In various implementations, the filter module 216 may analyze a set of the measured brake fluid pressures to determine whether to filter oscillation at the wheel rotational frequency, two times the wheel rotational frequency, or both the wheel rotational frequency and two times the wheel rotational frequency. For example, the filter module 216 may perform a Fourier Transform (FT) of a set of the measured brake fluid pressures. The filter module 216 may filter the measured brake fluid pressure to remove oscillation at the wheel rotational frequency, two times the wheel rotational frequency, or both the wheel rotational frequency and two times the wheel rotational frequency when the FT reveals oscillation at the wheel rotational frequency, two times the wheel rotational frequency, or both the wheel rotational frequency and two times the wheel rotational frequency, respectively.

Figure 5:
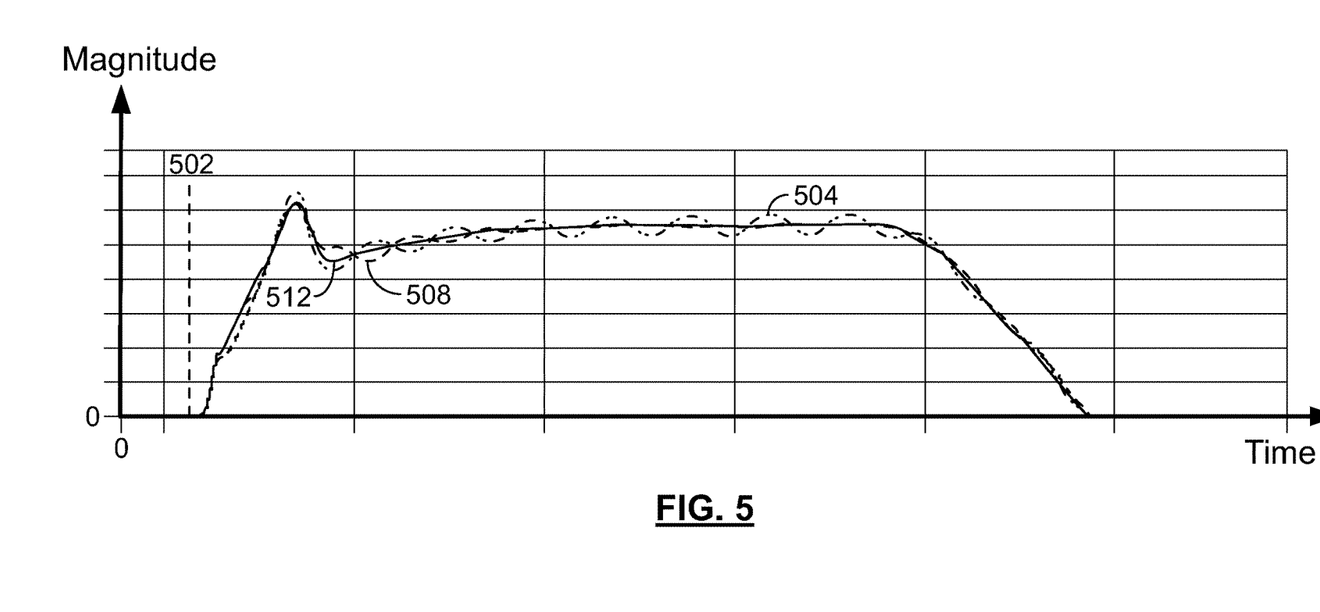
FIG. 5 is a graph showing a measured brake fluid pressure, a filtered brake fluid pressure, and a reference brake fluid pressure.

Referring now to FIG. 5, a graph illustrating a measured brake fluid pressure, a filtered brake fluid pressure, and a reference brake fluid pressure over time is presented. Brake pads are squeezed against a brake rotor beginning at approximately time 502.

Trace 504 tracks an example of the measured brake fluid pressure from the pressure sensor 9. Trace 508 tracks the filtered brake fluid pressure resulting from the filtering the measured brake fluid pressure 504 to remove oscillations at the wheel rotational frequency and two times the wheel rotational frequency, such as using the resonator module 304 discussed above with respect to FIG. 3. Trace 512 is a reference brake fluid pressure, for example, for a brake rotor that does not include any thickness variation.

As illustrated by the filtered brake fluid pressure 508, the oscillations in the measured brake fluid pressure 504 resulting from the thickness variations in the brake rotor at the one or two locations are attenuated by the filtering. The filtered brake fluid pressure 508 includes a minimal amount of undershoot and overshoot and reaches the reference brake fluid pressure 512.

Figure 6:
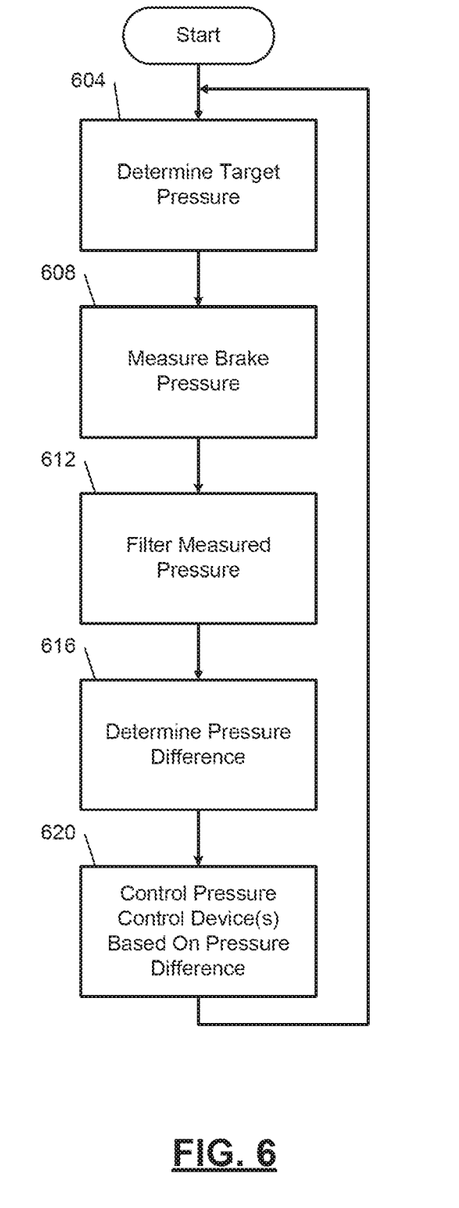
FIG. 6 is a flowchart depicting an example method of filtering a measured brake fluid pressure and controlling a braking system.

Referring now to FIG. 6, a flowchart depicting an example method of filtering the measured brake fluid pressure and controlling the braking system is presented. At 604, the target pressure module 204 determines the target pressure, such as based on at least one of a pressure request, the brake pedal position measured using the stroke sensor 16, and the brake fluid pressure measured using the pressure sensor 21. The target pressure is a target value of brake fluid pressure at the pressure sensor 9.

At 608, the measured brake fluid pressure from the pressure sensor 9 is obtained. The measured brake fluid pressure may be received from the pressure sensor 9 (e.g., if the pressure sensor 9 is a digital sensor) or the filter module 216 may sample and digitize the measured brake fluid pressure signal from the pressure sensor 9 (e.g., if the pressure sensor 9 is an analog sensor) to obtain the measured brake fluid pressure.

At 612, the filter module 216 filters the measured brake fluid pressure to produce the filtered brake fluid pressure. The filter module 216 filters the measured brake fluid pressure to remove oscillations that may be present at one and/or two times the wheel rotational frequency attributable to thickness variation of the brake rotor at one or two locations. As an example, the filter module 216 may determine a cancellation value and subtract the cancellation value from the measured brake fluid pressure. Another suitable form of filtering, however, may be performed.

At 616, the difference module 208 determines the pressure difference. The difference module 208 may, for example, set the pressure difference based on or equal to the target pressure minus the filtered brake fluid pressure. At 620, the pressure control module 212 controls the pressure control device 224 to adjust the pressure error toward zero. For example, the pressure control module 212 may drive the electric motor 28 to extend the piston 30 (e.g., to the left in FIG. 1B) to increase the measured brake fluid pressure when the filtered brake fluid pressure is less than the target pressure, and vice versa. Stated more generally, the pressure control module 212 may actuate one or more pressure control devices of the apply system 2 to increase the measured brake fluid pressure when the filtered brake fluid pressure is less than the target pressure, and vice versa. Control may return to 604 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A braking control system of a vehicle, comprising:
    a pressure control device that regulates brake fluid flow to a brake caliper of a wheel from a brake fluid cylinder;
    a pressure sensor that measures a pressure of the brake fluid applied to the brake caliper;
    a filter module that filters the measured pressure based on a rotational frequency of the wheel, the filtering producing a filtered pressure of the brake fluid applied to the brake caliper;
    a target pressure module that sets a target pressure for the brake fluid for application to the brake caliper;
    a difference module that determines a pressure difference between the filtered pressure and the target pressure; and
    a pressure control module that actuates the pressure control device based on the pressure difference.

2. The braking control system of claim 1 wherein, based on a plurality of values of the measured pressure from a predetermined period, determines whether to filter the measured pressure based on one of:
    (a) only the rotational frequency of the wheel;
    (b) only twice the rotational frequency of the wheel; and
    (c) both the rotational frequency of the wheel and twice the rotational frequency of the wheel.

3. The braking control system of claim 1 wherein the filter module filters the measured pressure based on at least one of (i) the rotational frequency of the wheel, (ii) twice the rotational frequency of the wheel, and (iii) both of (a) the rotational frequency of the wheel and (b) twice the rotational frequency of the wheel.

4. The braking control system of claim 1 further comprising:
    a wheel speed sensor that measures a rotational speed of the wheel; and
    a rotational frequency module that determines the rotational frequency of the wheel based on the rotational speed of the wheel.

5. The braking control system of claim 4 wherein the rotational frequency module determines the rotational frequency of the wheel based on an average rotational speed of all wheels of the vehicle.

6. The braking control system of claim 1 further comprising a brake pedal position sensor that measures a position of a brake pedal,
wherein the target pressure module determines the target pressure for the brake fluid output to the brake caliper based on the position of the brake pedal.

7. The braking control system of claim 1 wherein the pressure control module (i) actuates the pressure control device, thereby decreasing the measured pressure, when the difference is such that the filtered pressure is greater than the target pressure and (ii) actuates the pressure control device, thereby increasing the measured pressure, when the difference is such that the filtered pressure is less than the target pressure.

8. The braking control system of claim 1 wherein the filter module filters the measured pressure using a two-pole resonator.

9. The braking control system of claim 8 wherein the filter module sets the filtered pressure based on subtracting an output of the two-pole resonator from the measured pressure.

10. The braking control system of claim 1 wherein the filter module applies at least one of a notch filter and a stopband filter to the measured pressure at the rotational frequency of the wheel.

11. A braking control method of a vehicle, comprising:
by a pressure control device, regulating brake fluid flow to a brake caliper of a wheel from a brake fluid cylinder;
using a pressure sensor, measuring a pressure of the brake fluid output to the brake caliper;
filtering the measured pressure based on a rotational frequency of the wheel, the filtering producing a filtered pressure of the brake fluid output to the brake caliper;
setting a target pressure for the brake fluid output to the brake caliper;
determining a pressure difference between the filtered pressure and the target pressure; and
actuating the pressure control device based on the pressure difference.

12. The braking control method of claim 11 further comprising, based on a plurality of values of the measured pressure from a predetermined period, determining whether to filter the measured pressure based on one of:
(a) only the rotational frequency of the wheel;
(b) only twice the rotational frequency of the wheel; and
(c) both the rotational frequency of the wheel and twice the rotational frequency of the wheel.

13. The braking control method of claim 11 wherein filtering the measured pressure includes filtering the measured pressure based on at least one of (i) the rotational frequency of the wheel, (ii) twice the rotational frequency of the wheel, and (iii) both of (a) the rotational frequency of the wheel and (b) twice the rotational frequency of the wheel.

14. The braking control method of claim 11 further comprising:
measuring, using a wheel speed sensor, a rotational speed of the wheel; and
determining the rotational frequency of the wheel based on the rotational speed of the wheel.

15. The braking control method of claim 14 wherein determining the rotational frequency of the wheel includes determining the rotational frequency of the wheel based on an average rotational speed of all wheels of the vehicle.

16. The braking control method of claim 11 further comprising measuring, using a brake pedal position sensor, a position of a brake pedal,
wherein determining the target pressure includes determining the target pressure for the brake fluid output to the brake caliper based on the position of the brake pedal.

17. The braking control method of claim 11 wherein actuating the pressure control device includes:
(i) actuating the pressure control device, thereby decreasing the measured pressure, when the difference is such that the filtered pressure is greater than the target pressure; and
(ii) actuating the pressure control device, thereby increasing the measured pressure, when the difference is such that the filtered pressure is less than the target pressure.

18. The braking control method of claim 11 wherein filtering the measured pressure includes filtering the measured pressure using a two-pole resonator.

19. The braking control method of claim 18 wherein filtering the measured pressure includes setting the filtered pressure based on subtracting an output of the two-pole resonator from the measured pressure.

20. The braking control method of claim 11 wherein filtering the measured pressure includes applying at least one of a notch filter and a stopband filter to the measured pressure at the rotational frequency of the wheel.

* * * * *